(12) United States Patent
Kimura et al.

(10) Patent No.: US 12,246,743 B2
(45) Date of Patent: Mar. 11, 2025

(54) BIOLOGICAL STATE GUIDANCE DEVICE, BIOLOGICAL STATE GUIDANCE METHOD, AND STORAGE MEDIUM

(71) Applicant: HONDA MOTOR CO., LTD., Tokyo (JP)

(72) Inventors: Ryo Kimura, Wako (JP); Tsuyoshi Nojiri, Wako (JP); Hiroko Adachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 18/119,874

(22) Filed: Mar. 10, 2023

(65) Prior Publication Data

US 2023/0356740 A1 Nov. 9, 2023

(30) Foreign Application Priority Data

Mar. 31, 2022 (JP) .................... 2022-059112

(51) Int. Cl.
*B60W 50/16* (2020.01)
*B60W 40/08* (2012.01)
*B60W 50/14* (2020.01)

(52) U.S. Cl.
CPC ............ *B60W 50/16* (2013.01); *B60W 40/08* (2013.01); *B60W 2040/0818* (2013.01);
(Continued)

(58) Field of Classification Search
CPC .. B60W 50/16; B60W 40/08; B60W 2540/01; B60W 2540/225;
(Continued)

(56) References Cited

U.S. PATENT DOCUMENTS 2,017,026 A * 10/1935 Forrest .................. F04D 29/628
  415/223
10,457,179 B1 * 10/2019 Kentley-Klay ........ B60N 2/879
(Continued)

FOREIGN PATENT DOCUMENTS

| JP | 2017-084071 | 5/2017 |
| JP | 2019-525861 | 9/2019 |
| JP | 2019-214334 | 12/2019 |

OTHER PUBLICATIONS

Japanese Office Action for Japanese Patent Application No. 2022-059112 mailed Jul. 11, 2023.

*Primary Examiner* — Kerri L McNally
*Assistant Examiner* — Thang D Tran
(74) *Attorney, Agent, or Firm* — Amin, Turocy & Watson, LLP (57) ABSTRACT

A biological state guidance device includes a biological state estimation unit configured to estimate a biological state of a driver, a target value decision unit configured to decide on a target value of the biological state, an audio stimulus generation unit configured to generate an audio stimulus for guidance so that the biological state is close to a target value, a fellow passenger information acquisition unit configured to acquire fellow passenger information, a target state decision unit configured to decide on a target state of a biological state of the fellow passenger, and a vibration stimulus generation unit configured to control a vibration stimulus generation device for stimulating the fellow passenger by vibrations. The vibration stimulus generation unit generates the vibrations for guiding the fellow passenger to have the target state as the biological state.

19 Claims, 6 Drawing Sheets

(52) U.S. Cl.
CPC ... *B60W 2050/143* (2013.01); *B60W 2540/01* (2020.02); *B60W 2540/221* (2020.02); *B60W 2540/225* (2020.02); *B60W 2540/229* (2020.02)

(58) Field of Classification Search
CPC ..... B60W 2540/229; B60W 2540/221; B60W 2040/0818; B60W 2050/143
USPC .......................................................... 340/576
See application file for complete search history.

(56) References Cited

U.S. PATENT DOCUMENTS

| | | | |
|---|---|---|---|
| 2009/0146846 A1* | 6/2009 | Grossman | G08B 29/22 340/988 |
| 2012/0242819 A1* | 9/2012 | Schamp | G06V 20/597 348/78 |
| 2013/0171599 A1* | 7/2013 | Bleich | A63B 24/0062 434/247 |
| 2015/0002310 A1* | 1/2015 | Guo | H04W 4/80 340/901 |
| 2015/0126818 A1* | 5/2015 | Fung | A61B 5/02405 600/300 |
| 2015/0182160 A1* | 7/2015 | Kim | A61B 5/7475 600/301 |
| 2016/0001781 A1* | 1/2016 | Fung | G07C 9/37 701/36 |
| 2016/0258758 A1* | 9/2016 | Houston | G01D 5/145 |
| 2016/0371977 A1* | 12/2016 | Wingate | G08G 1/096844 |
| 2017/0041769 A1* | 2/2017 | Shim | H04B 1/385 |
| 2017/0164850 A1* | 6/2017 | Murphy | A61B 5/742 |
| 2018/0056867 A1* | 3/2018 | Modarres | B60W 50/16 |
| 2018/0204571 A1* | 7/2018 | Nada | G10L 15/22 |
| 2018/0204573 A1* | 7/2018 | Iwasa | G10L 15/30 |
| 2019/0322213 A1* | 10/2019 | Neumann | B60W 50/16 |
| 2020/0001892 A1* | 1/2020 | Aoi | E05F 15/73 |
| 2020/0053227 A1* | 2/2020 | Zhang | H04M 19/047 |
| 2020/0075043 A1* | 3/2020 | Kane | B60K 35/65 |
| 2020/0234161 A1* | 7/2020 | Taguchi | A61B 5/7267 |
| 2020/0283013 A1* | 9/2020 | Saito | B60W 50/14 |
| 2020/0394428 A1* | 12/2020 | Turcot | G06V 20/59 |
| 2023/0301863 A1* | 9/2023 | Lee | A61H 23/02 |

* cited by examiner

| IDENTIFICATION ID | TARGET STATE | CLASSIFIER PARAMETER |
|---|---|---|
| A | ALERTED STATE | ... |
| B | RELAXED STATE | ... |
| C | NORMAL STATE | ... |
| D | — | ... |

| ALERTNESS LEVEL | EXAMPLE OF BIOLOGICAL STATE |
|---|---|
| 0 | DISTRACTED |
| 1 | RELAXATION |
| 2 | NEUTRAL |
| 3 | CONCENTRATION |
| 4 | ALERTNESS |
| 5 | NERVOUS |

BIOLOGICAL STATE GUIDANCE DEVICE, BIOLOGICAL STATE GUIDANCE METHOD, AND STORAGE MEDIUM

CROSS-REFERENCE TO RELATED APPLICATION

Priority is claimed on Japanese Patent Application No. 2022-059112, filed Mar. 31, 2022, the content of which is incorporated herein by reference.

BACKGROUND OF THE INVENTION

Field of the Invention

The present invention relates to a biological state guidance device, a biological state guidance method, and a storage medium.

Description of Related Art

In recent years, efforts to provide access to sustainable transportation systems that take into account vulnerable groups among traffic participants have intensified. In order to implement such systems, research and development to further improve traffic safety and convenience through research and development on preventive safety technology have been mainly performed. With this as a background, for example, Japanese Unexamined Patent Application, First Publication No. 2019-214334 discloses technology for detecting an activation degree of the brain of a vehicle occupant, and when it is determined that the activation degree is not in an appropriate state, guiding the occupant from a current heart rate to a target heart rate by sound or vibration so that an activation state is optimized.

SUMMARY OF THE INVENTION

In relation to preventive safety technology, in the related art, a guidance stimulus for activating a driver's biological state is also provided to a fellow passenger in the same way. However, the guidance stimulus given to the driver is not necessarily a guidance stimulus suitable for a fellow passenger. For example, a guidance stimulus for promoting alertness is desired to be given to a driver, but a guidance stimulus for promoting sleep may be desired to be given to a child who is a fellow passenger.

Aspects of the present invention have been made in consideration of such circumstances and an objective of the present invention is to provide a biological state guidance device, a biological state guidance method, and a storage medium for giving an appropriate stimulus to a fellow passenger in addition to guiding a driver to have an appropriate biological state and contributing to the development of a sustainable transportation system.

In order to achieve the objective for solving the above-described problems, the present invention adopts the following aspects.

(1): According to an aspect of the present invention, there is provided a biological state guidance device including: a biological state estimation unit configured to estimate a biological state of a driver of a vehicle; a target value decision unit configured to decide on a target value that is an index for setting the biological state of the driver as a target state; an audio stimulus generation unit configured to control an audio stimulus generation device for generating an audio stimulus for guidance so that the biological state of the driver is close to a target value on the basis of the estimated biological state and the target value; a fellow passenger information acquisition unit configured to acquire fellow passenger information about a fellow passenger of the vehicle other than the driver; a target state decision unit configured to decide on a target state of a biological state of the fellow passenger on the basis of the fellow passenger information; and a vibration stimulus generation unit configured to control a vibration stimulus generation device for stimulating the fellow passenger by vibrations, wherein the vibration stimulus generation unit generates the vibrations for guiding the fellow passenger to have the target state as the biological state.

(2): In the above-described aspect (1), the vibration stimulus generation unit may change a vibration interval on the basis of beats per minute (BPM) of the audio stimulus.

(3): In the above-described aspect (1), the vibration stimulus generation unit may set a vibration interval to an integer multiple or divisor of an interval decided on the basis of BPM of the audio stimulus.

(4): In the above-described aspect (3), the target state may include at least an alerted state and a relaxed state, the vibration stimulus generation unit may set the vibration interval to the integer divisor of the interval decided on the basis of the BPM of the audio stimulus when the target state is the alerted state, and the vibration stimulus generation unit may set the vibration interval to the integer multiple of the interval decided on the basis of the BPM of the audio stimulus when the target state is the relaxed state.

(5): In the above-described aspect (4), the target state decision unit may determine whether or not the fellow passenger's eyes are open from the fellow passenger information and decide on the target state as the relaxed state when the fellow passenger's eyes are closed.

(6): In the above-described aspect (4), the target state decision unit may determine whether or not the fellow passenger is active from the fellow passenger information and decide on the target state as the alerted state when the fellow passenger is active.

(7): In the above-described aspect (4), the target state decision unit may determine whether or not the fellow passenger is in conversation from the fellow passenger information and decide that the target state is a normal state when it is determined that the fellow passenger is in conversation, and the vibration stimulus generation unit may set the vibration interval to the same extent as the interval decided on the basis of the BPM of the audio stimulus.

(8): In any one of the above-described aspects (1) to (7), the vibration stimulus generation unit may generate the vibrations by vibrating a vibrator provided on a seat where the fellow passenger sits.

(9): In any one of the above-described aspects (1) to (8), the target value decision unit may further decide on the target value on the basis of information selected by the driver, and the target state decision unit may further decide on the target state on the basis of information selected by the fellow passenger.

(10) According to an aspect of the present invention, there is provided a biological state guidance method including: estimating, by an in-vehicle computer, a biological state of a driver of a vehicle; deciding, by the in-vehicle computer, on a target value that is an index for setting the biological state of the driver as a target state; controlling, by the in-vehicle computer, an audio stimulus generation device for generating an audio stimulus for guidance so that the biological state of the driver is close to a target value on the basis of the estimated biological state and the target value; acquiring, by the in-vehicle computer, fellow passenger information about a fellow passenger of the vehicle other than the driver; deciding, by the in-vehicle computer, on a target state of a biological state of the fellow passenger on the basis of the fellow passenger information; and controlling, by the in-vehicle computer, a vibration stimulus generation device for stimulating the fellow passenger by vibrations to guide the fellow passenger to have the target state as the biological state.

(11) According to an aspect of the present invention, there is provided a storage medium storing a program for causing an in-vehicle computer to: estimate a biological state of a driver of a vehicle; decide on a target value that is an index for setting the biological state of the driver as a target state; control an audio stimulus generation device for generating an audio stimulus for guidance so that the biological state of the driver is close to a target value on the basis of the estimated biological state and the target value; acquire fellow passenger information about a fellow passenger of the vehicle other than the driver; decide on a target state of a biological state of the fellow passenger on the basis of the fellow passenger information; and control a vibration stimulus generation device for stimulating the fellow passenger by vibrations to guide the fellow passenger to have the target state as the biological state.

According to the above-described aspects (1), (10), and (11), the audio stimulus may not be appropriate for the fellow passenger in some cases and it is also possible to guide the fellow passenger to have an appropriate target state due to a vibration stimulus in the cases.

According to the above-described aspect (2), even if the fellow passenger is listening to the audio stimulus, it becomes difficult for the fellow passenger to feel uncomfortable with the vibrations.

According to the above-described aspect (3), even if the fellow passenger is listening to the audio stimulus, it becomes difficult for the fellow passenger to feel uncomfortable with the vibrations.

According to the above-described aspect (4), the fellow passenger is guided to have the heart rate at the vibration interval, thereby facilitating guidance for the target state as the biological state.

According to the above-described aspect (5), it is possible to give an appropriate guidance stimulus even if the fellow passenger is sleeping.

According to the above-described aspect (6), when the fellow passenger is active, there is a possibility of a situation where activation is desired or a situation where he or she is likely to get car sick and it is possible to perform activation by providing guidance for an alerted state and contribute to the reduction of car sickness by making the sympathetic nerves dominant in this case.

According to the above-described aspect (7), when the fellow passenger is guided to have the normal state, it is possible to make it easier for the fellow passenger to be in the same biological state as the driver.

According to the above-described aspect (8), it is possible to effectively stimulate the fellow passenger.

According to the above-described aspect (9), the driver or the fellow passenger may also desire to have a desired biological state and a guidance stimulus can be given on the basis of information selected by the driver or the fellow passenger in this case.

DETAILED DESCRIPTION OF THE INVENTION

Hereinafter, embodiments of a biological state guidance device, a biological state guidance method, and a storage medium of the present invention will be described.

[Vehicle System]

Figure 1:
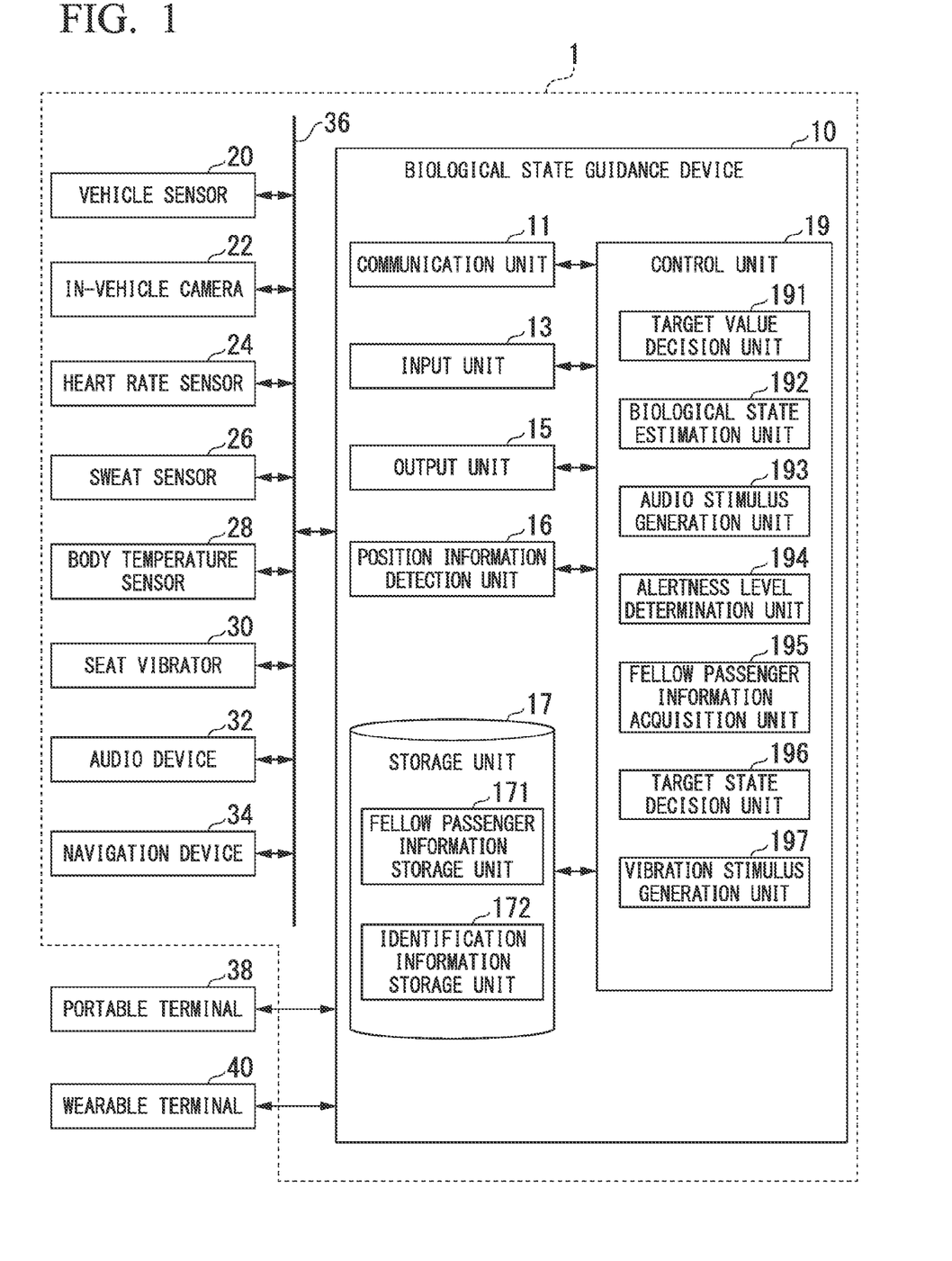
FIG. 1 is a schematic block diagram showing a system configuration of a vehicle system in which a biological state guidance device is mounted.

FIG. 1 is a configuration diagram of a vehicle system 1 in which a biological state guidance device 10 according to an embodiment is mounted. A vehicle in which the vehicle system 1 is mounted (hereinafter referred to as a host vehicle M) is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. When an electric motor is provided, the electric motor operates using electric power generated by a power generation unit connected to the internal combustion engine or electric power that is supplied when a secondary battery or a fuel cell is discharged. Although not shown, the vehicle in which the vehicle system 1 is mounted includes driving operation element units such as an accelerator pedal, a brake pedal, and a steering wheel provided in a normal vehicle, a travel driving force output device, a brake device, a steering device, and a control unit.

The vehicle system 1 includes, for example, a biological state guidance device 10, a vehicle sensor 20, an in-vehicle camera 22, a heart rate sensor 24, a sweat sensor 26, a body temperature sensor 28, a seat vibrator 30, an audio device 32, and a navigation device 34. An occupant of the vehicle in which the vehicle system 1 is mounted holds, for example, a portable terminal (smartphone) 38 and a wearable terminal 40. Such devices and equipment are connected to each other by a multiplex communication line such as a controller area network (CAN) communication line, a serial communication line, or a wireless communication network (hereinafter simply referred to as an in-vehicle network 36). The configuration shown in FIG. 1 is merely an example and some of the components may be omitted or other components may be further added.

The vehicle sensor 20 includes a vehicle speed sensor configured to detect the speed of the host vehicle M, an acceleration sensor configured to detect acceleration, a gyro sensor configured to detect an angular velocity, a direction sensor configured to detect a direction of the host vehicle M, and the like. The vehicle sensor 20 may detect a magnitude of vibration received from a road surface on which the host vehicle M is traveling (not shown).

Although not shown, the vehicle sensor 20 may include an operation element sensor such as an accelerator opening degree sensor, a brake sensor, a steering sensor, or a grip sensor provided in a driving operation element unit. The accelerator opening degree sensor detects an operation amount of the accelerator pedal (an accelerator opening degree). The brake sensor detects the operation amount of the brake pedal. The brake sensor detects a depression amount of a brake pedal on the basis of, for example, a change in the brake pedal or the hydraulic pressure of the master cylinder of the brake device. The steering sensor detects the operation amount of the steering wheel. The steering sensor is provided, for example, on a steering shaft and detects the operation amount of the steering wheel on the basis of a rotation angle of the steering shaft. The steering sensor may detect the steering torque and detect the operation amount of the steering wheel on the basis of the detected steering torque. The grip sensor is, for example, a capacitive sensor provided in a circumferential direction of the steering wheel. The grip sensor detects that a physical object (the occupant's hand) has come into contact with an area of a detection target as a change in capacitance. These vehicle sensors 20 transmit the acquired sensor information to the biological state guidance device 10 via the in-vehicle network 36.

The in-vehicle camera 22 is a digital camera using, for example, a solid-state imaging sensor such as a charge-coupled device (CCD) or a complementary metal oxide semiconductor (CMOS). The in-vehicle camera 22 is attached at a position where an occupant of the host vehicle M (for example, an occupant sitting in the driver's seat is hereinafter referred to as a driver and an occupant sitting in a passenger seat or a rear seat is referred to as a fellow passenger) can be imaged. The in-vehicle camera 22 images, for example, an imaging target area, at prescribed intervals and transmits a captured image to the biological state guidance device 10 via the in-vehicle network 36. The in-vehicle camera 22 may be a stereo camera.

The heart rate sensor 24 detects the occupant's heart rate as the biological state. The heart rate sensor 24 may be, for example, a heart rate sensor provided on a steering wheel, millimeter-wave radar in the cabin, a pressure sensor provided on the seat belt, or a heart rate sensor or an ultrasonic sensor provided on a child seat. The heart rate sensor 24 transmits an electrical signal corresponding to the occupant's detected heart rate to the biological state guidance device 10 via the in-vehicle network 36.

The sweat sensor 26 detects an amount of sweat of the occupant as a biological state. The sweat sensor 26 is provided, for example, on the steering wheel, and detects the amount of sweat when the occupant grips the steering wheel while driving. The sweat sensor 26 transmits an electrical signal corresponding to the detected amount of sweat of the occupant to the biological state guidance device 10 via the in-vehicle network 36.

The body temperature sensor 28 detects the body temperature of the occupant as the biological state. The body temperature sensor 28 may be, for example, a thermal camera provided in the cabin. The body temperature sensor 28 transmits an electrical signal corresponding to the detected body temperature of the occupant to the biological state guidance device 10 via the in-vehicle network 36.

The seat vibrator 30 is provided in a part of the seat of the host vehicle M (a seat cushion that supports the buttocks and thighs of the occupant, a seat back that supports the waist and back of the occupant, a headrest that supports the head and neck of the occupant, or the like). The seat vibrator 30 vibrates the seat by generating vibrations according to an electrical signal received via the in-vehicle network 36.

The audio device (car stereo) 32 includes, for example, an operation unit, a media holding unit, a playback unit, and a modulation unit, and stores music information in a storage device such as a hard disk drive (HDD) or a flash memory. Although not shown, the audio device 32 is connected to an external speaker. The audio device 32 plays music information stored in the storage device or music information of media held in the media holding unit according to an operation of the occupant from the operation unit or a control signal from the biological state guidance device 10 via the in-vehicle network 36 and outputs the music information to an external speaker. The audio device can change a beats per minute (BPM) rate and pitch of music information by the modulation unit and play the music information. The audio device 32 may acquire music information from an external server via a communication device mounted in the vehicle.

Although not shown, the navigation device 34 includes, for example, a global navigation satellite system (GNSS) receiver, a navigation human machine interface (HMI), and a route decision unit and holds map information in a storage device such as a hard disk drive (HDD) or a flash memory. The GNSS receiver identifies a position of the host vehicle M on the basis of a signal received from a GNSS satellite. The position of the host vehicle M may be identified or corrected by an inertial navigation system (INS) using an output of the vehicle sensor 20. The navigation HMI includes a display device, a speaker, a touch panel, a key, and the like. For example, the route decision unit decides on a route from the position of the host vehicle M identified by the GNSS receiver (or any input position) to a destination input by the occupant (hereinafter referred to as a route on a map) using the navigation HMI with reference to the map information. The map information is, for example, information in which a road shape is expressed by a link indicating a road and nodes connected by the link. The map information may include curvature of a road, point of interest (POI) information, and the like. The navigation device 34 may provide route guidance using the navigation HMI on the basis of the route on the map decided on by the route decision unit. The position information of the host vehicle M identified by the GNSS receiver, information about the destination input by the occupant, and information about the route on the map decided on by the route decision unit are output to the biological state guidance device 10 or the like via the in-vehicle network 36.

The navigation device 34 may be implemented by, for example, a function of a terminal device such as a smartphone or a tablet terminal owned by an occupant. The navigation device 34 may transmit the current position and the destination to the navigation server via the communication device mounted in the vehicle and acquire the route on the map returned from the navigation server. The vehicle system 1 may include a GNSS receiver (GPS receiver) separate from the navigation device 34 and acquire position information of the host vehicle M.

The portable terminal (smartphone) 38 includes, for example, a central processing unit (CPU), a random-access memory (RAM), a read-only memory (ROM), an auxiliary storage unit including a flash memory, a communication unit, a display unit, an input unit, and various types of sensors. In the portable terminal 38, the CPU reads various types of programs stored in the auxiliary storage unit or the like into the RAM and executes the programs, such that the programs perform intended functions. The portable terminal 38 communicates with the biological state guidance device 10 via wireless communication, and transmits, for example, various types of information of the occupant who is the owner of the portable terminal 38 and information acquired from various types of sensors. The portable terminal 38 may play the roles of various vehicle sensors 20, the audio device 32, and the navigation device 34 of the vehicle system 1.

The wearable terminal 40 includes, for example, a wristwatch-type portable terminal, and includes a CPU, a RAM, a ROM, an auxiliary storage unit including a flash memory, a communication unit, a display unit, an input unit, and various types of sensors. In the wearable terminal 40, the CPU reads various types of programs stored in the auxiliary storage unit or the like into the RAM and executes the programs, such that the programs perform intended functions. The wearable terminal 40 communicates with the biological state guidance device 10 via wireless communication, and transmits, for example, various types of information of the occupant who is the owner of the wearable terminal 40 and information acquired from various types of sensors. The wearable terminal 40 may play the roles of various types of vehicle sensors 20, the heart rate sensor 24, the sweat sensor 26, the body temperature sensor 28, the audio device 32, and the navigation device 34 in the vehicle system 1.

[Biological State Guidance Device]

Next, the biological state guidance device 10 will be described in detail. The biological state guidance device 10 is an information processing device capable of communication, for example, an in-vehicle computer. The biological state guidance device 10 includes a communication unit 11, an input unit 13, an output unit 15, a position information detection unit 16, a storage unit 17, and a control unit 19.

The communication unit 11 is a communication device. The communication unit 11 communicates with other equipment and devices via the in-vehicle network 36. Also, the communication unit 11 communicates with the portable terminal 38 and the wearable terminal 40 via wireless communication.

The input unit 13 is an input device such as a button or a touch panel. The input unit 13 is operated by the occupant when the occupant's instructions are input to the biological state guidance device 10. The input unit 13 may be an interface for connecting the input device to the biological state guidance device 10. In this case, the input unit 13 inputs an input signal generated in response to the input of the occupant in the input device to the biological state guidance device 10. The biological state guidance device 10 may use the portable terminal 38 or the wearable terminal 40 as an input device. In this case, the communication unit 11 (or the input unit 13) inputs an input signal generated in response to the input of the occupant in these terminals to the biological state guidance device 10.

The output unit 15 may be, for example, an image display device such as a liquid crystal display or an organic electroluminescent (EL) display. The output unit 15 may provide an output to an external speaker connected to the audio device 32. In this case, the output signal is output to the audio device 32 via the communication unit 11 (or the output unit 15). The output unit 15 outputs information to the occupant. The input unit 13 and the output unit 15 may be configured as an integrated touch panel display.

The position information detection unit 16 detects (acquires) position information indicating a current position of the biological state guidance device 10 (the host vehicle M). The position information detection unit 16 may be configured using, for example, a Global Positioning System (GPS) receiver. The position information detection unit 16 may be configured to detect position information on the basis of, for example, reception strengths of signals received from a plurality of base stations of mobile communication. In this case, some of the functions of the position information detection unit 16 may be implemented in the control unit 19. The biological state guidance device 10 may acquire position information indicating the current position from the navigation device 34, the GNSS receiver (GPS receiver) provided in the vehicle system 1, the portable terminal 38, and the wearable terminal 40.

The storage unit 17 is a storage device such as a magnetic hard disk device or a semiconductor storage device. The storage unit 17 stores information necessary for a process of the control unit 19. The storage unit 17 includes at least a fellow passenger information storage unit 171 and an identification information storage unit 172.

Figure 2:
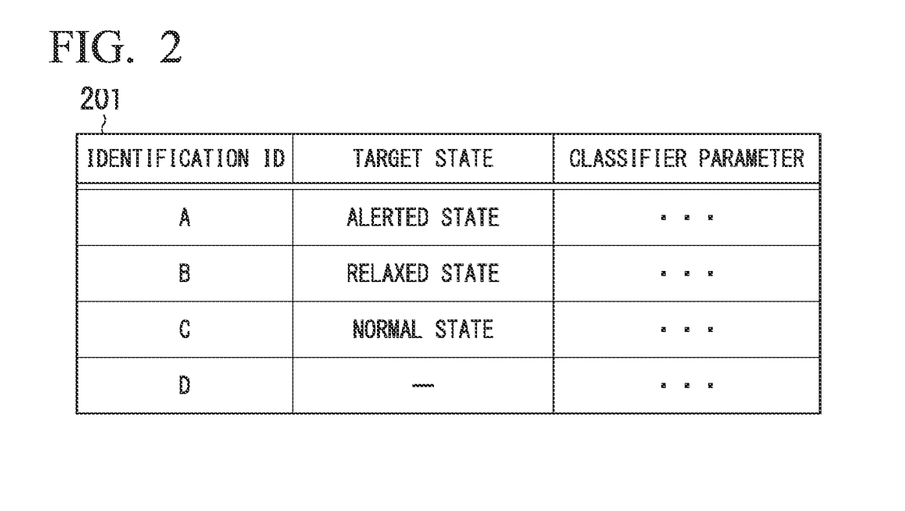
FIG. 2 is a diagram showing a specific example of fellow passenger information.

The fellow passenger information storage unit 171 stores information about a fellow passenger other than the driver among the occupants (hereinafter also referred to as fellow passenger information). FIG. 2 is a diagram showing an example of fellow passenger information 201. Specifically, the fellow passenger information 201 includes identification information for identifying the information for each fellow passenger (an identification ID or a fellow passenger name), a target state that is a target biological state of the fellow passenger, and classifier parameters learned from a plurality of pieces of image data of the fellow passenger in advance. There are three types of target states, for example, "relaxed state," "normal state," and "alerted state." Fellow passenger information may not be set for the fellow passenger. Also, for example, the target state may not be set even if there is fellow passenger information.

In the example of FIG. 2, in the case of "A," for example, the target biological state is set as the "alerted state" because of easy intoxication or the like. In the case of "B" as an infant, the target biological state is set as the "relaxed state." In the case of "C," the target biological state is set as the "normal state." In the case of "D," the target biological state has not been set.

The identification information storage unit 172 stores classifier parameters for identifying the state of a fellow passenger learned from image data of a person in advance. For example, there are a classifier parameter for identifying whether or not the fellow passenger's eyes are closed, a classifier parameter for identifying whether or not the fellow passenger is in conversation, and a classifier parameter for identifying whether the fellow passenger is active such as whether a game or a smartphone is being used, whether reading is being conducted, or whether a video on a monitor is being watched.

The control unit 19 is a processor such as a CPU and a memory. The control unit 19 functions as a target value decision unit 191, a biological state estimation unit 192, an audio stimulus generation unit 193, an alertness level determination unit 194, a fellow passenger information acquisition unit 195, a target state decision unit 196, and a vibration stimulus generation unit 197 when a processor executes a program. All or some of the functions of the control unit 19 may be implemented using hardware such as an application-specific integrated circuit (ASIC), a programmable logic device (PLD), or a field-programmable gate array (FPGA). The above program may be recorded on a computer-readable recording medium. Computer-readable recording media include, for example, a portable medium such as a flexible disk, a magneto-optical disk, a ROM, a compact disc (CD)-ROM, or a semiconductor storage device (for example, a solid-state drive (SSD)) and a storage device such as a hard disk and a semiconductor storage device built into computer systems. The above-described program may be transmitted via a telecommunication circuit.

Figure 3:
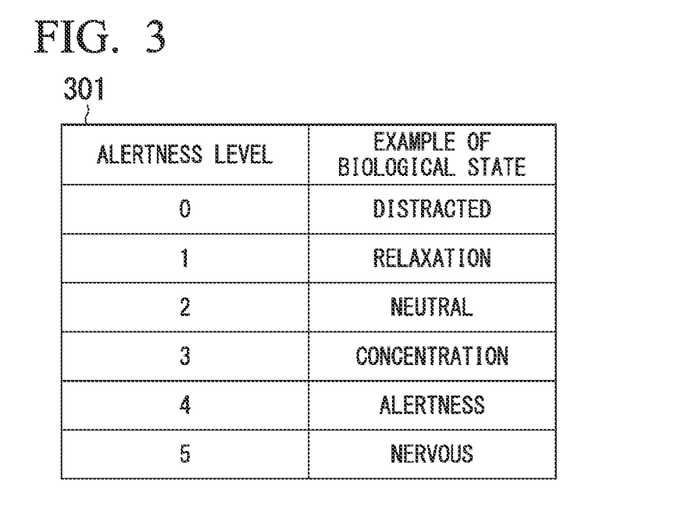
FIG. 3 is a diagram showing a specific example of an alertness level.

The target value decision unit 191 decides on a target value of an alertness level related to the driver's biological state. FIG. 3 is a diagram showing an example of an alertness level 301. The "alertness level" is classified into six levels, for example, "0," "1," "2," "3," "4," and "5," which correspond to "distracted," "relaxation," "neutral," "concentration," "alertness," and "nervous" of the "biological state," respectively. In the example of the alertness level 301, the "biological state" is closer to "distracted" when the "alertness level" is lower and the "biological state" is closer to "nervous" when the "alertness level" is higher. The target value decision unit 191 may decide on a target value of an alertness level related to the biological state of the driver in accordance with various situations such as information about the destination and information about the driver. For example, the target value decision unit 191 may set the target value of the alertness level to "2" corresponding to "neutral."

The biological state estimation unit 192 estimates the alertness level (hereinafter also referred to as the driver's alertness level) on the basis of information acquired from various types of sensors (20, 24, 26, and 28) and the in-vehicle camera 22. The estimated alertness level uses the same index as the alertness level 301 shown in FIG. 3. For example, the biological state estimation unit 192 acquires the driver's heart rate from the heart rate sensor 24, classifies the heart rate into six levels, and estimates the alertness level corresponding thereto. Also, for example, the biological state estimation unit 192 acquires the driver's sweat amount from the sweat sensor 26, classifies the sweat amount into six levels, and estimates the alertness level corresponding thereto. Also, for example, the biological state estimation unit 192 acquires the driver's body temperature from the body temperature sensor 28, classifies the body temperature into six levels, and estimates the alertness level corresponding thereto. For example, the biological state estimation unit 192 obtains eye movement information from the driver's image acquired from the in-vehicle camera 22, classifies the eye movement amount into six levels, and estimates the alertness level corresponding thereto.

Also, for example, the biological state estimation unit 192 acquires information such as the speed and acceleration of the host vehicle M, a yaw rate, an accelerator opening degree, a brake operation amount, a steering wheel operation amount, a correction steering angle, and a steering angle speed from the vehicle sensor 20, classifies the information into six levels, and estimates the alertness level corresponding thereto. The information from the vehicle sensor 20 is not information about the driver's biological state, but is information regarded as being related to the driver's biological state.

The biological state estimation unit 192 may estimate the driver's alertness level on the basis of a plurality of estimated alertness levels. For example, the biological state estimation unit 192 may estimate the driver's alertness level by taking an average value of a plurality of alertness levels or weighting them. The biological state estimation unit 192 may acquire information of the heart rate, the sweat amount, and the body temperature from the wearable terminal 40.

The audio stimulus generation unit 193 generates an audio stimulus for providing guidance so that the driver's alertness level estimated by the biological state estimation unit 192 is close to a target value of the alertness level decided on by the target value decision unit 191. Specifically, when the driver's alertness level is less than the target value, the audio stimulus generation unit 193 selects and generates (plays) alertness audio content as a stimulus for alerting the driver. When the driver's alertness level is greater than the target value, the audio stimulus generation unit 193 selects (plays) relaxation audio content as a stimulus for relaxing the driver. The audio stimulus generation unit 193 does nothing when the driver's alertness level is the same as the target value.

As an audio stimulus, for example, the audio stimulus generation unit 193 may cause the audio device 32 to play effective BPM music by transmitting a signal to the audio device 32 or play currently playing music by modulating the currently playing music (changing a playback pitch). As an alertness audio content, for example, the audio stimulus generation unit 193 causes the audio device 32 to play music having a high BPM rate or to play music with a BPM rate or a pitch increased by a prescribed percentage in accordance with a difference between the target value and the current alertness level. As a relaxation audio content, the audio stimulus generation unit 193 causes the audio device 32 to play music having a low BPM rate or to play music with a BPM rate or a pitch decreased by a prescribed percentage in accordance with a difference between the target value and the current alertness level. For example, when a heart rate is used as the alertness level, the audio stimulus generation unit 193 may cause the audio device 32 to play music with a BPM rate or a pitch increased by a prescribed percentage in the alertness audio content or with a BPM rate or a pitch decreased by a prescribed percentage in the relaxation audio content on the basis of a heart rate at the normal time or the current time. Likewise, the audio stimulus generation unit 193 may cause music to be played by transmitting a control signal to the portable terminal 38 or the wearable terminal 40 instead of the audio device 32.

The alertness level determination unit 194 determines whether or not the driver's alertness level has reached the target value of the alertness level determined by the target value decision unit 191 when the audio stimulus generation unit 193 generates an audio stimulus (plays audio content).

The fellow passenger information acquisition unit 195 acquires information about the fellow passenger. Specifically, the fellow passenger information acquisition unit 195 controls the in-vehicle camera 22 to acquire image data of the fellow passenger other than the driver among the occupants and detect whether the fellow passenger is in the vehicle. The fellow passenger information acquisition unit 195 acquires fellow passenger information from the fellow passenger information storage unit 171. The fellow passenger information includes information for identifying the information for each fellow passenger (an identification ID or a fellow passenger name), a target state that is a target biological state of the fellow passenger, and classifier parameters learned from a plurality of pieces of image data of the fellow passenger in advance. Also, the fellow passenger information acquisition unit 195 identifies (specifies) the fellow passenger using the classifier provided in the biological state guidance device 10 using the acquired image data and the classifier parameters of each fellow passenger. Also, the fellow passenger information acquisition unit 195 acquires information of the target state corresponding to the identified fellow passenger. When the target state is not set for the identified fellow passenger, the fellow passenger information acquisition unit 195 cannot acquire the target state information. The above-described fellow passenger identification method performed by the fellow passenger information acquisition unit 195 is an example and the present invention is not limited to this method. The classifier may be provided in the fellow passenger information acquisition unit 195, the target state decision unit 196 to be described subsequently, or another unit.

The target state decision unit 196 decides on the target state that is the target biological state of the fellow passenger from the current state of the fellow passenger and the like. Specifically, when the fellow passenger information acquisition unit 195 can acquire the target state information of the fellow passenger, the target state decision unit 196 decides on the acquired target state as the target state of the fellow passenger. When the fellow passenger information acquisition unit 195 cannot acquire the target state information of the fellow passenger, the target state decision unit 196 estimates the current state of the fellow passenger using the classifier provided in the biological state guidance device 10 using the acquired image data of the fellow passenger and the classifier parameters acquired from the identification information storage unit 172. Also, for example, the target state decision unit 196 sets the target state as the "relaxed" state when the fellow passenger's eyes are open, set the target state as the "normal state" when the fellow passenger is in conversation, sets the target state as the "alerted state" when the fellow passenger is active, and sets the target state as the "relaxed state" in other cases. The combination of the estimated current state of the fellow passenger described above and the target state is an example and the present invention is not limited thereto. For example, in determining whether or not a fellow passenger is in conversation, the target state decision unit 196 may use audio information that can be acquired from the microphone of the portable terminal 38 or the wearable terminal 40.

The vibration stimulus generation unit 197 vibrates the seat by vibrating the seat vibrator 30 provided in the fellow passenger's seat at an effective interval. Specifically, when the target state, which is the target biological state of the fellow passenger, is the "alerted state," the vibration stimulus generation unit 197 generates vibrations by setting a vibration interval of the seat vibrator 30 to an integer divisor of an interval decided on the basis of BPM or a pitch of the audio content being played by the audio stimulus generation unit 193. The vibrations have short intervals and are seat vibrations for alertness. On the other hand, when the target state, which is the target biological state of the fellow passenger, is the "relaxed state," the vibration stimulus generation unit 197 generates vibrations by setting the vibration interval of the seat vibrator 30 to an integer multiple of the interval decided on the basis of the BPM or the pitch of the audio content being played by the audio stimulus generation unit 193. The vibrations have long intervals and are seat vibrations for relaxation. Furthermore, when the target state, which is the target biological state of the fellow passenger, is the "normal state," the vibration stimulus generation unit 197 generates vibrations by setting the vibration interval of the seat vibrator 30 identical to the interval decided on the basis of the BPM or the pitch of the audio content being played by the audio stimulus generation unit 193. In this case, the vibration stimulus generation unit 197 may prevent the seat vibrator 30 from vibrating.

Figure 4:
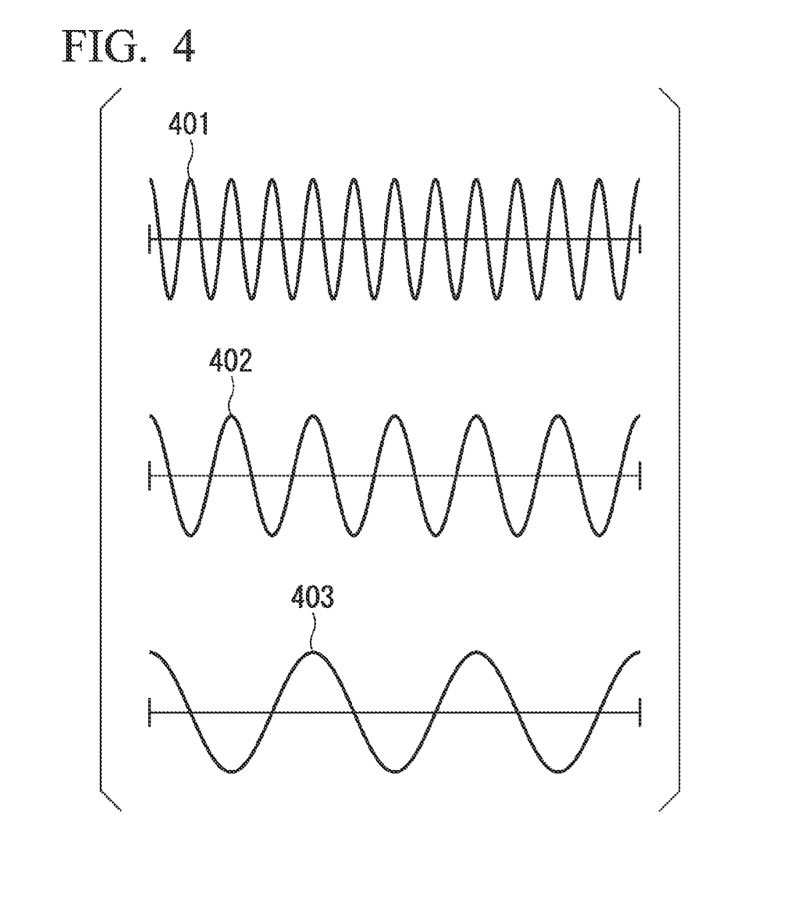
FIG. 4 is a diagram showing a specific example of vibrations generated by a seat vibrator in a vibration stimulus generation unit.

FIG. 4 is a diagram showing a specific example of vibrations generated by the vibration stimulus generation unit 197 using the seat vibrator 30. Normal seat vibrations 402 are vibrations having an interval identical to an interval of audio content being played by the audio stimulus generation unit 193. Alertness seat vibrations 401 are an example of vibrations with an interval that is ½ that of the normal seat vibrations 402. Relaxation seat vibrations 403 are an example of vibrations with an interval that is twice that of the normal seat vibrations 402. The seat vibration is generated once per cycle.

[Processing Flow]

Figure 5:
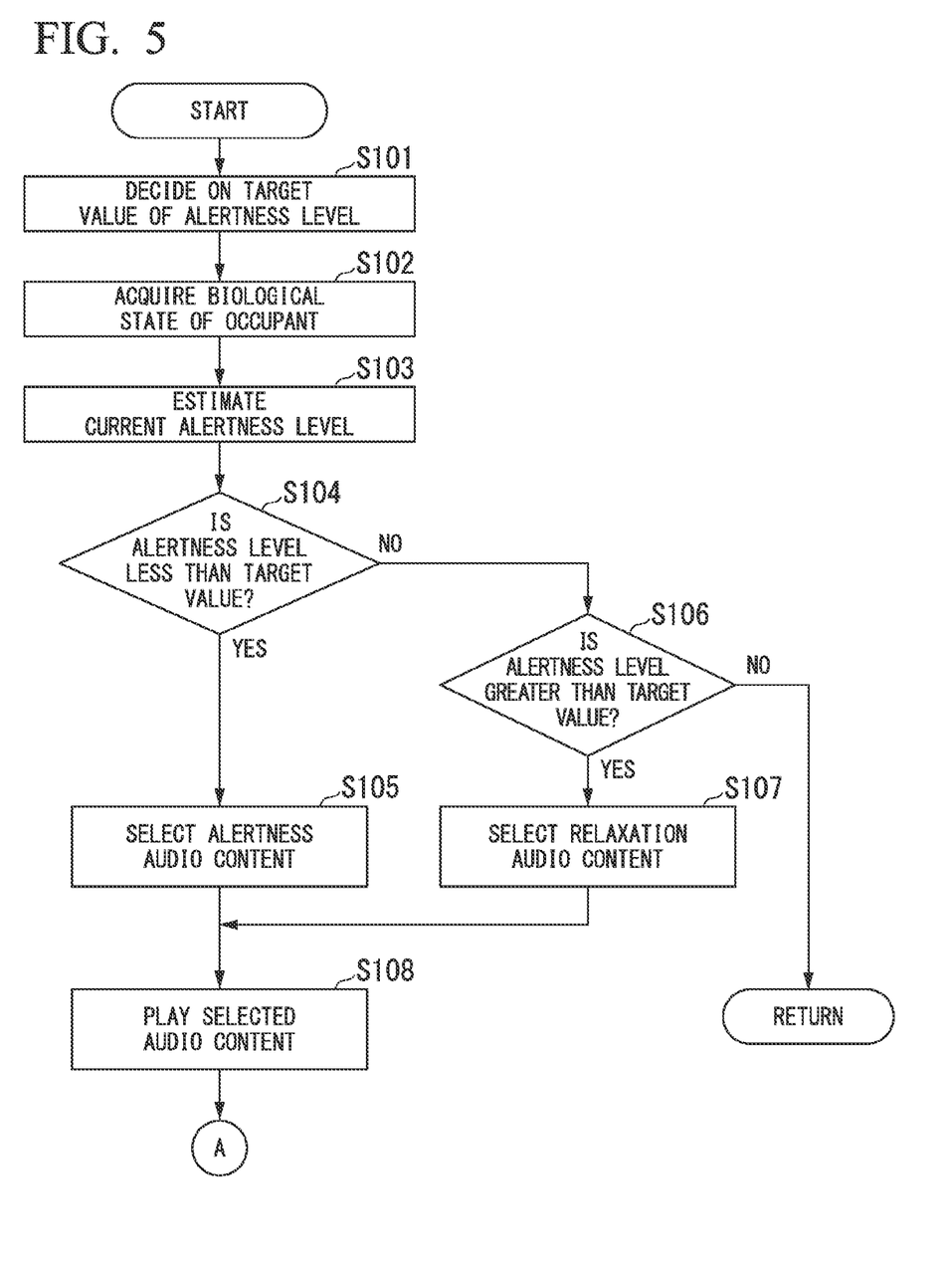
FIG. 5 is a flowchart showing an example of a flow of a biofeedback process based on audio content for a driver in the biological state guidance device.
Figure 6:
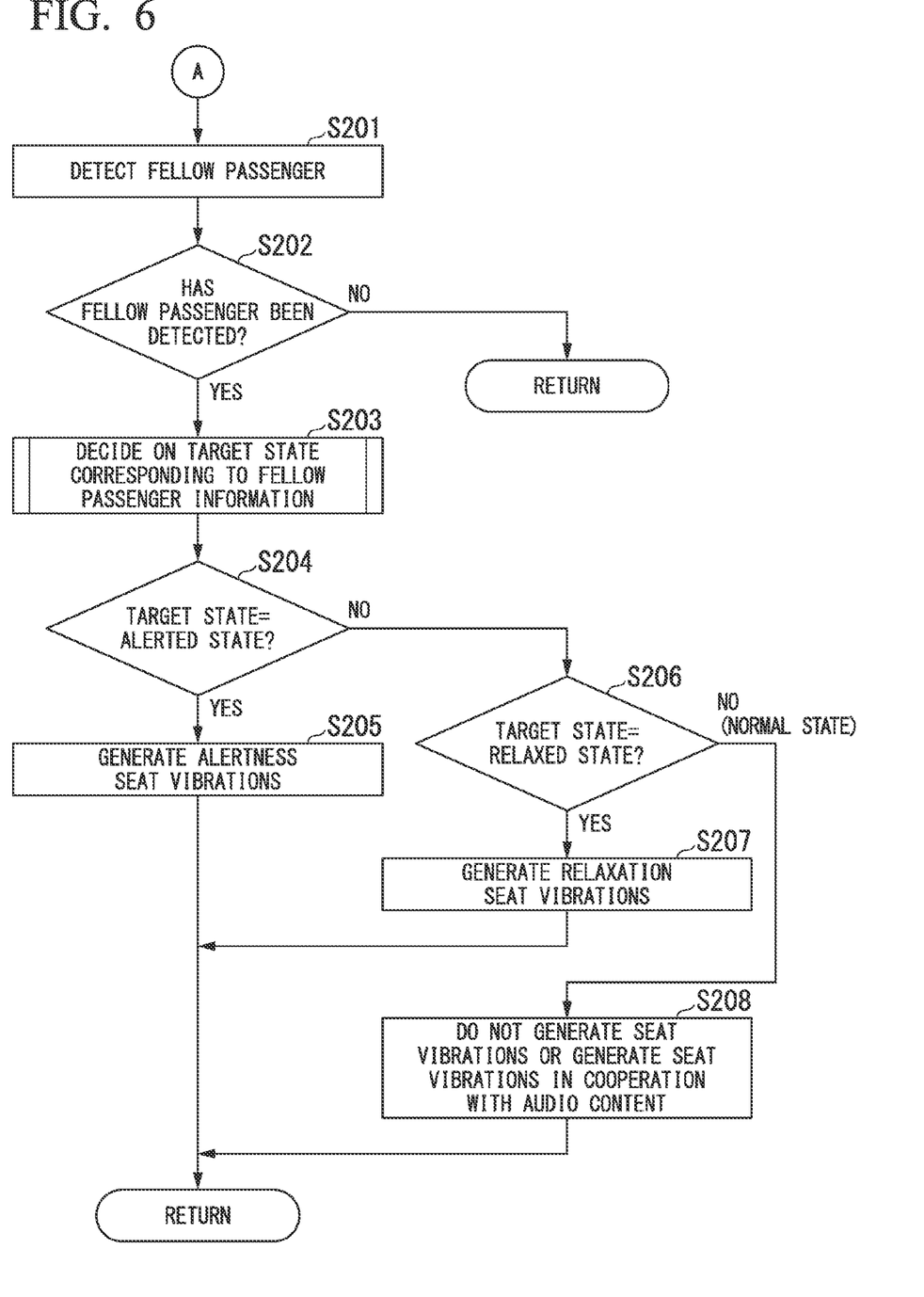
FIG. 6 is a flowchart showing an example of a flow of a process of vibrating a fellow passenger seat in the biological state guidance device.
Figure 7:
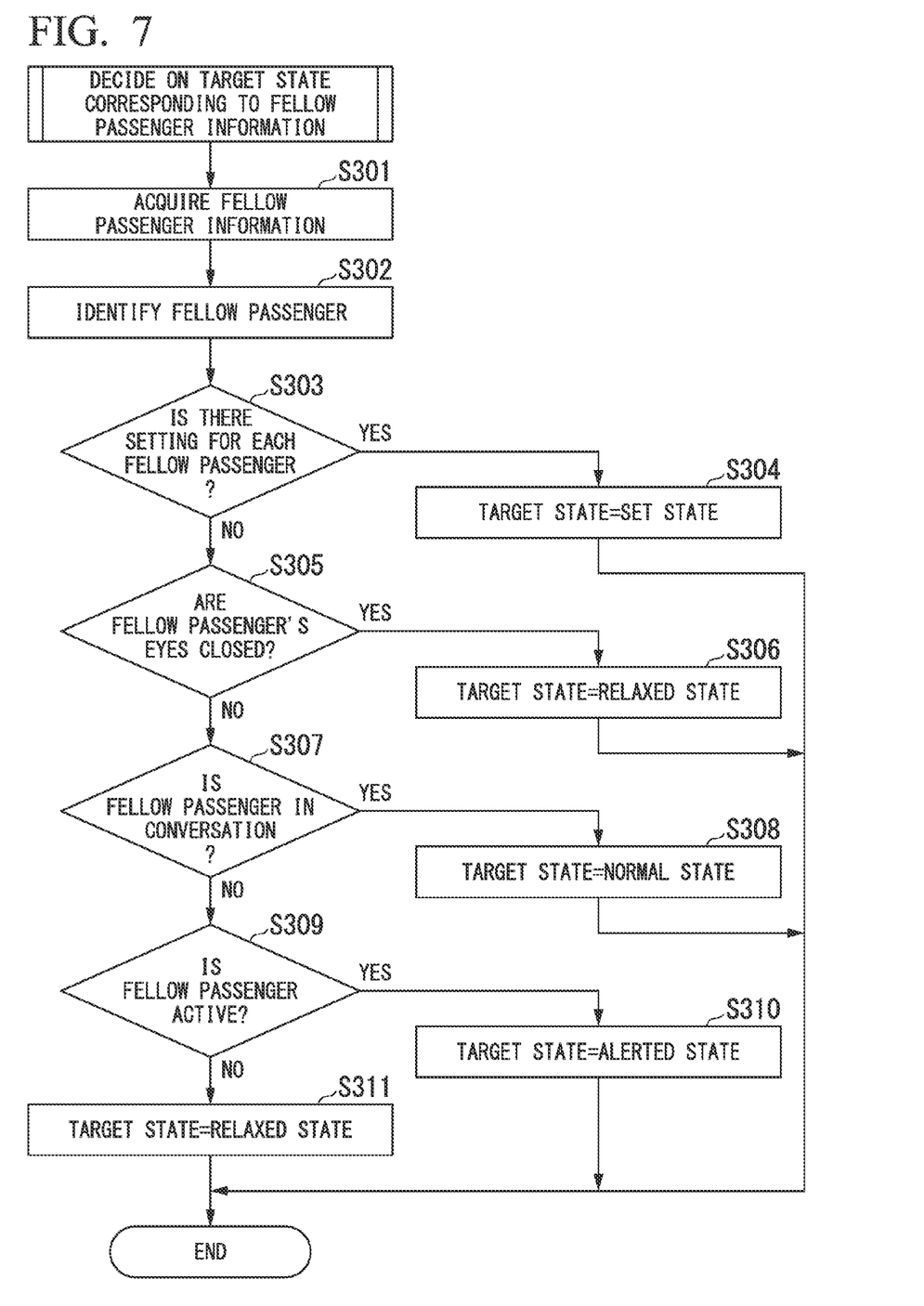
FIG. 7 is a flowchart showing an example of a flow of a process of deciding on a target state of a fellow passenger corresponding to the fellow passenger information in the biological state guidance device.

FIGS. 5, 6, and 7 are flowcharts showing an example of a flow of a process of the biological state guidance device 10. FIG. 5 is a flowchart showing an example of a flow of a biofeedback process based on audio content for the driver. FIG. 6 is a continuation of FIG. 5 and is a flowchart showing an example of a flow of a process of vibrating the fellow passenger seat. FIG. 7 is a flowchart showing an example of a flow of a process of deciding on the target state of the fellow passenger corresponding to the fellow passenger information. The processes of FIGS. 5 and 6 (FIG. 7) are iteratively executed at a prescribed interval.

First, the target value decision unit 191 sets the target value of the alertness level related to the biological state of the driver to "2" corresponding to "neutral" (step S101). The target value decision unit 191 may decide on the target value of the alertness level related to the biological state of the driver in accordance with various situations such as information about the destination and information about the driver.

Subsequently, the biological state estimation unit 192 acquires information about the biological state or information regarded as being related to the biological state from the heart rate sensor 24, the sweat sensor 26, the body temperature sensor 28, the in-vehicle camera 22, the various types of vehicle sensors 20, and/or the wearable terminal 40 (step S102).

Subsequently, the biological state estimation unit 192 estimates the alertness level related to the driver's biological state from information about the acquired biological state (step S103). The alertness level is estimated in six levels, for example, as shown in FIG. 3.

Subsequently, the audio stimulus generation unit 193 determines whether or not the driver's alertness level is less than the target value (step S104). When the driver's alertness level is less than the target value (Yes in step S104), the audio stimulus generation unit 193 selects audio content for alertness (step S105). On the other hand, when the driver's alertness level is not less than the target value, the audio stimulus generation unit 193 determines whether or not the driver's alertness level is greater than the target value (step S106). When the driver's alertness level is greater than the target value (Yes in step S106), the audio stimulus generation unit 193 selects the audio content for relaxation (step S107). On the other hand, when the driver's alertness level is the same as the target value, the control unit 19 of the biological state guidance device 10 ends the process.

Subsequently, the audio stimulus generation unit 193 plays the selected audio content to stimulate the driver (step S108). The audio stimulus generation unit 193 causes the audio device 32 to play music having a high BPM rate, for example, as the audio content for alertness, or play music with a BPM rate or a pitch increased by a prescribed percentage in accordance with a difference between the target value and the current alertness level. The audio stimulus generation unit 193 causes the audio device 32 to play music having a low BPM rate, for example, as the audio content for relaxation, or play music with a BPM rate or a pitch decreased by a prescribed percentage in accordance with a difference between the target value and the current alertness level. Subsequently, the control unit 19 of the biological state guidance device 10 transfers control to step S201 of FIG. 6.

Subsequently, the fellow passenger information acquisition unit 195 controls the in-vehicle camera 22 to acquire image data of a fellow passenger other than the driver among the occupants and detect whether or not the fellow passenger is in the vehicle (step S201). When the fellow passenger is not in the vehicle, the control unit 19 of the biological state guidance device 10 ends the process. On the other hand, when a fellow passenger is in the vehicle (Yes in step S202), the fellow passenger information acquisition unit 195 performs a process of deciding on the target state corresponding to the fellow passenger information (step S203).

Referring to FIG. 7, the fellow passenger information acquisition unit 195 acquires fellow passenger information from the fellow passenger information storage unit 171 (step S301). As illustrated in FIG. 2, the fellow passenger information includes information for identifying the information for each fellow passenger (an identification ID or a fellow passenger name), a target state that is a target biological state of the fellow passenger, and classifier parameters learned from a plurality of pieces of image data of the fellow passenger in advance.

Subsequently, the fellow passenger information acquisition unit 195 identifies (specifies) a fellow passenger using a classifier provided in the biological state guidance device 10 using the acquired image data and the classifier parameters of each fellow passenger (step S302). Also, the fellow passenger information acquisition unit 195 acquires information of the target state corresponding to the identified fellow passenger. When the target state is not set for the identified fellow passenger, the fellow passenger information acquisition unit 195 cannot acquire the target state information.

Subsequently, the target state decision unit 196 determines whether or not the fellow passenger information acquisition unit 195 has been able to acquire the target state information of the fellow passenger (step S303). When the fellow passenger information acquisition unit 195 has been able to acquire the target state information of the fellow passenger (Yes in step S303), the target state decision unit 196 decides on the acquired target state (the target state set in the fellow passenger information) as the target state of the fellow passenger (step S304).

On the other hand, when the fellow passenger information acquisition unit 195 has not been able to acquire the target state information of the fellow passenger, the target state decision unit 196 estimates whether or not the fellow passenger's eyes are closed with the classifier provided in the biological state guidance device 10 using the acquired fellow passenger image data and the classifier parameters acquired from the identification information storage unit 172 (step S305). When the fellow passenger's eyes are closed (Yes in step S305), the target state decision unit 196 decides on the target state of the fellow passenger as the "relaxed state" (step S306).

On the other hand, when the fellow passenger's eyes are not closed, the target state decision unit 196 estimates whether or not the fellow passenger is in conversation with the classifier provided in the biological state guidance device 10 using the acquired fellow passenger image data and the classifier parameters acquired from the identification information storage unit 172 (step S307). In determining whether or not the fellow passenger is in conversation, the target state decision unit 196 may use audio information that can be acquired from the microphone of the portable terminal 38 or the wearable terminal 40. When the fellow passenger is in conversation (Yes in step S307), the target state decision unit 196 decides on the target state of the fellow passenger as the "normal state" (step S308).

On the other hand, when the fellow passenger is not in conversation, the target state decision unit 196 estimates whether or not the fellow passenger is active with the classifier provided in the biological state guidance device 10 using the acquired fellow passenger image data and the classifier parameters acquired from the identification information storage unit 172 (step S309). The term "active" indicates, for example, playing a game or smartphone, reading, or watching a video on a monitor. When the fellow passenger is active (Yes in step S309), the target state decision unit 196 decides that the target state of the fellow passenger is the "alerted state" (step S310).

On the other hand, when the fellow passenger is not active, the target state decision unit 196 decides on the target state of the fellow passenger as the "relaxed state" (step S311). When the target state of the fellow passenger has been decided on, the control unit 19 of the biological state guidance device 10 returns control to step S204 of FIG. 6.

Subsequently, the vibration stimulus generation unit 197 determines whether or not the target state, which is the target biological state of the fellow passenger, is an "alerted state" (step S204). When the target state is an "alerted state" (Yes in step S204), the vibration stimulus generation unit 197 generates vibrations (seat vibrations for alertness) by setting a vibration interval of the seat vibrator 30 provided in the fellow passenger's seat to an integer divisor of an interval decided on the basis of BPM or a pitch of the audio content being played by the audio stimulus generation unit 193 (step S205).

On the other hand, when the target state is not an "alerted state," the vibration stimulus generation unit 197 determines whether or not the target state, which is the target biological state of the fellow passenger, is a "relaxed state" (step S206). When the target state is a "relaxed state" (Yes in step S206), the vibration stimulus generation unit 197 generates vibrations (seat vibrations for relaxation) by setting a vibration interval of the seat vibrator 30 provided in the fellow passenger's seat to an integer multiple of the interval decided on the basis of the BPM or the pitch of the audio content being played by the audio stimulus generation unit 193 (step S207).

On the other hand, when the target state is not a "relaxed state," the vibration stimulus generation unit 197 sets the target state, which is the target biological state of the fellow passenger, as the "normal state" and generates vibrations by setting the vibration interval of the seat vibrator 30 identical to the interval decided on the basis of the BPM or the pitch of the audio content being played by the audio stimulus generation unit 193. In this case, the vibration stimulus generation unit 197 may prevent the seat vibrator 30 from vibrating (step S208).

Accordingly, the processes of the biological state guidance device 10 of FIGS. 5, 6, and 7 (a biofeedback process based on audio content for the driver, a process of deciding on the target state of the fellow passenger corresponding to the fellow passenger information, and a process of vibrating the fellow passenger seat) are completed.

As described above, according to the present embodiment, the target value decision unit 191 sets a target value of an alertness level, the biological state estimation unit 192 estimates the alertness level of the driver from information about the biological state, the audio stimulus generation unit 193 selects the audio content on the basis of the alertness level of the driver and the target value and plays the audio content for the driver, the biological state estimation unit 192 re-estimates the alertness level of the driver from the information about the biological state, and the alertness level determination unit 194 determines whether or not the alertness level of the driver has reached the target value. Also, the fellow passenger information acquisition unit 195 specifies the fellow passenger, the target state decision unit 196 decides on the target state, which is the target biological state of the fellow passenger in accordance with the state of the fellow passenger, and the vibration stimulus generation unit 197 generates vibrations in the seat of the fellow passenger in harmony with the interval of the played audio content in accordance with the target state.

Thereby, it is possible to give an appropriate stimulus to a fellow passenger in addition to guiding a driver to have an appropriate biological state. The audio content may not be appropriate for the fellow passenger in some cases and it is also possible to guide the fellow passenger to have an appropriate target state due to a seat vibration stimulus in the cases. Even if the fellow passenger is listening to the audio content, it becomes difficult for the fellow passenger to feel uncomfortable with the seat vibrations. The fellow passenger is guided to have the heart rate at the vibration interval and therefore guidance for the target state as the biological state is facilitated. It is possible to give an appropriate guidance stimulus even if the fellow passenger is sleeping. When the fellow passenger is active, there is a possibility of a situation where activation is desired or a situation where he or she is likely to get car sick and it is possible to perform activation by providing guidance for an alerted state and contribute to the reduction of car sickness by making the sympathetic nerves dominant in this case. When the fellow passenger is guided to have the normal state, it is possible to make it easier for the fellow passenger to be in the same biological state as the driver. The driver or the fellow passenger may also desire to have a desired biological state and a guidance stimulus can be given on the basis of information selected by the driver or the fellow passenger in this case.

Although modes for carrying out the present invention have been described above using embodiments, the present invention is not limited to the embodiments and various modifications and substitutions can also be made without departing from the scope and spirit of the present invention.

Although the control unit 19 of the biological state guidance device 10 performs a process of vibrating the fellow passenger seat in FIG. 6 after the audio content is played in step S108, for example, in the above-described processing flow, the biological state estimation unit 192 may estimate an alertness level of the driver by sequentially acquiring information about a biological state of the driver from various types of sensors as in the process of FIG. 6 after the audio content is played, the alertness level determination unit 194 may determine whether or not the alertness level of the driver is equal to the target value, and the audio stimulus generation unit 193 may stop the playback of the audio content when the alertness level of the driver is not equal to the target value.

Although biofeedback based on audio content for the driver is performed, biofeedback based on seat vibrations may also be performed for the fellow passenger. To do this, after the processing of steps S205, S206, or S207 of FIG. 6, the fellow passenger's biological information (for example, alertness level) is acquired and similar seat vibrations are repeated if the target state has not been reached.

For example, if alertness audio content for the driver is selected and the fellow passenger is also given alertness seat vibrations, the fellow passenger is likely to be alerted. Thus, the seat vibrations may be given to the fellow passenger only when the target state of alertness or relaxation of the driver is different from the target state of alertness or relaxation of the fellow passenger.

The state of the fellow passenger in steps S305, S307, and S309 is an example, and the target state, which is the target biological state of the fellow passenger, may be decided on from other states. Of course, the target state of a different biological state may be decided on for each of the plurality of fellow passengers and different seat vibrations may be given.

What is claimed is:

1. A biological state guidance device comprising:
multiple sensors configured to acquire information regarding a biological state of a driver of a vehicle;
an audio sensor stimulus generation device for generating an audio stimulus to the driver;
a vibration stimulus generation device for stimulating a fellow passenger by vibrations; and
a controller configured to
estimate the biological state of the driver based on the information from the multiple sensors;
decide on a target value that is an index for setting the biological state of the driver as a target state;
control the audio stimulus generation device for generating the audio stimulus for guidance so that the biological state of the driver is close to a target value based on the estimated biological state and the target value;
acquire fellow passenger information about the fellow passenger of the vehicle other than the driver;
decide on a target state of a biological state of the fellow passenger based on the fellow passenger information; and
control the vibration stimulus generation device
wherein the controller generates the vibrations for guiding the fellow passenger to have the target state as the biological state, and
wherein the controller generates the vibrations in a case where the target value of the driver is different from the target state of the fellow passenger.

2. The biological state guidance device according to claim 1,
wherein the target state includes at least an alerted state and a relaxed state,
wherein the controller sets the vibration interval to the integer divisor of the interval decided on the basis of the BPM of the audio stimulus when the target state is the alerted state, and
wherein the controller sets the vibration interval to the integer multiple of the interval decided on the basis of the BPM of the audio stimulus when the target state is the relaxed state.

3. The biological state guidance device according to claim 2, wherein the controller determines whether or not the fellow passenger's eyes are open from the fellow passenger information and decides on the target state as the relaxed state when the fellow passenger's eyes are closed.

4. The biological state guidance device according to claim 2, wherein the controller determines whether or not the fellow passenger is active from the fellow passenger information and decides on the target state as the alerted state when the fellow passenger is active.

5. The biological state guidance device according to claim 2,
wherein the controller determines whether or not the fellow passenger is in conversation from the fellow passenger information and decides that the target state is a normal state when it is determined that the fellow passenger is in conversation, and
wherein the controller sets the vibration interval to the same extent as the interval decided on the basis of the BPM of the audio stimulus.

6. The biological state guidance device according to claim 1, wherein the controller generates the vibrations by vibrating a vibrator provided on a seat where the fellow passenger sits.

7. The biological state guidance device according to claim 1, wherein the controller further decides on the target value on the basis of information selected by the driver, and wherein the controller further decides on the target state on the basis of information selected by the fellow passenger.

8. A biological state guidance method comprising:
estimating, by an in-vehicle computer, a biological state of a driver of a vehicle;
deciding, by the in-vehicle computer, on a target value that is an index for setting the biological state of the driver as a target state;
controlling, by the in-vehicle computer, an audio stimulus generation device for generating an audio stimulus for guidance so that the biological state of the driver is close to a target value on the basis of the estimated biological state and the target value;
acquiring, by the in-vehicle computer, fellow passenger information about a fellow passenger of the vehicle other than the driver;
deciding, by the in-vehicle computer, on a target state of a biological state of the fellow passenger on the basis of the fellow passenger information; and
controlling, by the in-vehicle computer, a vibration stimulus generation device for stimulating the fellow passenger by vibrations to guide the fellow passenger to have the target state as the biological state,
wherein the vibrations are generated in a case where the target value of the driver is different from the target state of the fellow passenger.

9. A computer-readable non-transitory storage medium storing a program for causing an in-vehicle computer to:
estimate a biological state of a driver of a vehicle;
decide on a target value that is an index for setting the biological state of the driver as a target state;
control an audio stimulus generation device for generating an audio stimulus for guidance so that the biological state of the driver is close to a target value on the basis of the estimated biological state and the target value;
acquire fellow passenger information about a fellow passenger of the vehicle other than the driver;
decide on a target state of a biological state of the fellow passenger on the basis of the fellow passenger information; and
control a vibration stimulus generation device for stimulating the fellow passenger by vibrations to guide the fellow passenger to have the target state as the biological state,
wherein the vibrations are generated in a case where the target value of the driver is different from the target state of the fellow passenger.

10. A biological state guidance method comprising:
estimating, by an in-vehicle computer, a biological state of a driver of a vehicle;
deciding, by the in-vehicle computer, on a target value that is an index for setting the biological state of the driver as a target state;
controlling, by the in-vehicle computer, an audio stimulus generation device for generating an audio stimulus for guidance so that the biological state of the driver is close to a target value on the basis of the estimated biological state and the target value;
acquiring, by the in-vehicle computer, fellow passenger information about a fellow passenger of the vehicle other than the driver;
deciding, by the in-vehicle computer, on a target state of a biological state of the fellow passenger on the basis of the fellow passenger information; and
controlling, by the in-vehicle computer, a vibration stimulus generation device for stimulating the fellow passenger by vibrations to guide the fellow passenger to have the target state as the biological state,
wherein the in-vehicle computer changes a vibration interval of the vibrations on the basis of beats per minute (BPM) of the audio stimulus.

11. A computer-readable non-transitory storage medium storing a program for causing an in-vehicle computer to:
estimate a biological state of a driver of a vehicle;
decide on a target value that is an index for setting the biological state of the driver as a target state;
control an audio stimulus generation device for generating an audio stimulus for guidance so that the biological state of the driver is close to a target value on the basis of the estimated biological state and the target value;
acquire fellow passenger information about a fellow passenger of the vehicle other than the driver;
decide on a target state of a biological state of the fellow passenger on the basis of the fellow passenger information; and
control a vibration stimulus generation device for stimulating the fellow passenger by vibrations to guide the fellow passenger to have the target state as the biological state,
wherein the in-vehicle computer changes a vibration interval of the vibrations on the basis of beats per minute (BPM) of the audio stimulus.

12. A biological state guidance device comprising:
a multiple sensors configured to acquire information regarding a biological state of a driver of a vehicle;
an audio stimulus generation device for generating an audio stimulus to the driver;
a vibration stimulus generation device for stimulating a fellow passenger by vibrations; and
a controller configured to
estimate the biological state of the driver based on the information from the multiple sensors;
decide on a target value that is an index for setting the biological state of the driver as a target state;
control the audio stimulus generation device for generating the audio stimulus for guidance so that the biological state of the driver is close to a target value based on the estimated biological state and the target value;
acquire fellow passenger information about the fellow passenger of the vehicle other than the driver;
decide on a target state of a biological state of the fellow passenger based on the fellow passenger information; and control the vibration stimulus generation device,
wherein the controller generates the vibrations for guiding the fellow passenger to have the target state as the biological state, and
wherein the controller changes a vibration interval on the basis of beats per minute (BPM) of the audio stimulus.

13. The biological state guidance device according to claim 12, wherein the controller sets a vibration interval to an integer multiple or divisor of an interval decided on the basis of BPM of the audio stimulus.

14. The biological state guidance device according to claim 13,
wherein the target state includes at least an alerted state and a relaxed state,
wherein the controller sets the vibration interval to the integer divisor of the interval decided on the basis of the BPM of the audio stimulus when the target state is the alerted state, and
wherein the controller sets the vibration interval to the integer multiple of the interval decided on the basis of the BPM of the audio stimulus when the target state is the relaxed state.

15. The biological state guidance device according to claim 14, wherein the controller determines whether or not the fellow passenger's eyes are open from the fellow passenger information and decides on the target state as the relaxed state when the fellow passenger's eyes are closed.

16. The biological state guidance device according to claim 14, wherein the controller determines whether or not the fellow passenger is active from the fellow passenger information and decides on the target state as the alerted state when the fellow passenger is active.

17. The biological state guidance device according to the claim 14, wherein the controller determines whether or not the fellow passenger is in conversation from the fellow passenger information and decides that the target state is a normal state when it is determined that the fellow passenger is in conversation, and wherein the controller sets the vibration interval to the same extent as the interval decided on the basis of the BPM of the audio stimulus.

18. The biological state guidance device according to claim 12, wherein the controller generates the vibrations by vibrating a vibrator provided on a seat where the fellow passenger sits.

19. The biological state guidance device according to the claim 12, wherein the controller further decides on the target value on the basis of information selected by the driver, and wherein the controller further decides on the target state on the basis of information selected by the fellow passenger.

* * * * *